(12) United States Patent
Tanabe et al.

(10) Patent No.: US 7,751,703 B2
(45) Date of Patent: Jul. 6, 2010

(54) ELECTRONIC DEVICE

(75) Inventors: Shigeru Tanabe, Osaka (JP); Minoru Wakabayashi, Osaka (JP)

(73) Assignee: Sanyo Electric Co., Ltd., Moriguchi-shi (JP)

(*) Notice: Subject to any disclaimer, the term of this patent is extended or adjusted under 35 U.S.C. 154(b) by 0 days.

(21) Appl. No.: 12/361,266

(22) Filed: Jan. 28, 2009

(65) Prior Publication Data

US 2009/0190288 A1 Jul. 30, 2009

(30) Foreign Application Priority Data

Jan. 30, 2008 (JP) .............................. 2008-018966

(51) Int. Cl.
*G03B 17/02* (2006.01)
(52) U.S. Cl. ...................... 396/535; 396/539
(58) Field of Classification Search ................. 396/535, 396/539
See application file for complete search history.

(56) References Cited

U.S. PATENT DOCUMENTS 6,930,727 B2 * 8/2005 Uwagawa et al. ........... 348/374
7,004,648 B2 * 2/2006 Ariga ........................ 396/419
7,043,282 B2   5/2006 Inomata et al.
2001/0008584 A1 * 7/2001 Morinaga .................... 396/539

FOREIGN PATENT DOCUMENTS

JP   2000-330172 A   11/2000
JP   2003-86160 A    3/2003

* cited by examiner

*Primary Examiner*—Rodney E Fuller
(74) *Attorney, Agent, or Firm*—Westerman, Hattori, Daniels & Adrian, LLP

(57) ABSTRACT

An electronic device has a casing with an article housing formed therein openable/closable by means of a lid. A locking mechanism locking the lid to a closing position comprises a locking member movably supported with respect to the casing and an engagement reception piece formed on the lid and engaging with the locking member. The locking member moves among a locking position where the locking member engages with the engagement reception piece to lock the lid to the closing position, a first unlocking position where the locking member retreats from the locking position and is removed from the engagement reception piece while the part of the locking member projects to the opening of the article housing, and a second unlocking position where the locking member retreats from the first unlocking position and the part of the locking member does not project to the opening of the article housing.

4 Claims, 8 Drawing Sheets

ELECTRONIC DEVICE

The Japanese application Number 2008-18966, upon which this patent application is based, is hereby incorporated by reference.

BACKGROUND OF THE INVENTION

1. Field of the Invention

The present invention relates to electronic devices such as a camera, and particularly to an electronic device equipped with a locking mechanism for locking a lid such as a battery lid to the closing position.

2. Description of Related Art

Conventionally, an electronic device such as a digital camera has a casing with a battery housing formed therein, and a lid which opens and closes an opening of the battery housing is attached to the casing. The lid can be locked to a closing position by a locking mechanism.

In such an electronic device, there has been proposed a lid opening and closing device provided with a first locking member for locking the lid to the closing position and a second locking member for retaining the battery in the battery housing.

According to such a lid opening and closing device, even when the first locking member is unlocked to open the lid, since the battery is retained in the battery housing by the second locking member, the battery does not jump out of the housing to turn the power off, or fall from the housing.

However, the electronic device provided with the first locking member and the second locking member has a problem of increasing the number of parts for providing two locking members, and a problem of making the operation vexatious and complicated due to the locking operations and unlocking operations of the two locking members in order.

SUMMARY OF THE INVENTION

The present invention provides an electronic device capable of locking a stored article such as a battery as well as a lid, and locking only the stored article, separately and with easy operation using a single locking member.

The electronic device according to the present invention has a casing provided with an article housing formed therein. The article housing opens toward the outside of the casing, and can be opened and closed by a lid pivoted on the casing. The lid can be locked to a closing position by a locking mechanism.

The locking mechanism comprises a locking member movably supported with respect to the casing, and an engagement receiving section formed on the lid and to be engaged with the locking member. The locking member can be moved among a locking position, a first unlocking position and a second unlocking position by a moving operation. At the locking position, a part of the locking member projects to an opening of the article housing so that the locking member engages with the engagement receiving section to lock the lid to the closing position. At the first unlocking position, the locking member retreats from the locking position, leaving the engagement receiving section, while the part of the locking member still projects to the opening of the article housing. At the second unlocking position, the locking member further retreats from the first unlocking position and does not project to the opening of the article housing.

Here, the movement of the locking member is not limited to the movement of a straight line, but also includes rotating movement around one point, and the movement along a curve such as a circular arc.

According to the electronic device of the present invention, when the locking member moves to the locking position with an article such as a battery accommodated in the article housing of the casing and covered by the lid, the part of the locking member projects to the opening of the article housing so that the article of the article housing is locked to the housing position by the locking member, while the locking member engages with the engagement receiving section to lock the lid to the closing position.

When the locking member moves to the first unlocking position from the locking position, the locking member leaves the engagement receiving section to unlock the lid, while the part of the locking member still projects to the opening of the article housing to keep the article within the article housing locked to the housing position by the locking member. Here, the lid can be opened, and the article within the article housing does not fall even when the lid is open.

When the locking member moves to the second unlocking position from the first unlocking position, the locking member completely retreats from the opening of the article housing to unlock the article within the article housing, remaining separated from the engagement receiving section. With the locking member being in the second unlocking position, the article within the article housing can be removed from the article housing.

In particular, the locking mechanism includes a click feeling providing mechanism for providing a click feeling to the operation of the locking member when the locking member moves between the locking position and the first unlocking position. According to this particular configuration, when the locking member is moved from the locking position to the first unlocking position as well as when the locking member is moved from the first unlocking position to the locking position, the click feeling providing mechanism operates to provide a click feeling to the operation by the user, thereby realizing good operability.

Also, in a particular configuration, the locking mechanism includes an urging member for urging the locking member from the second unlocking position toward the first unlocking position. According to this particular configuration, the locking member is urged by the urging member toward the first unlocking position, and held at the first unlocking position. Therefore, it is not possible that the article within the article housing is suddenly unlocked.

In another particular configuration, the lid and the locking member include a cam face and a cam receiving face on the parts opposed to each other respectively. The cam face and the cam receiving face come into slidable contact with each other to press the locking member from the locking position to the first unlocking position when the lid is closed with the locking member located at the locking position. According to this particular configuration, even if excessive force is applied to the lid in the closing direction when the locking member is at the locking position, the cam face and the cam receiving face come into slidable contact with each other to press the locking member toward the first unlocking position, and therefore, the locking member moves to the first unlocking position to avoid interference between the locking member and the engagement receiving section of the lid. As a result, the engagement receiving section is prevented from being damaged.

In addition, it is possible to adopt the structure in which the locking member moves from the locking position to the first unlocking position by closing the lid with the locking member located at the locking position. In this structure, the click feeling providing mechanism operates in the process described above, and then, when the lid is closed completely, the locking member reaches the first unlocking position. And it is also possible to adopt the structure in which by closing the lid with the locking member located at the locking position, the click feeling providing mechanism performs only a first half of the operation, and when the lid is completely closed, the locking member returns to the locking position due to the repulsion power of the click feeling providing mechanism.

As described, according to the electronic device of the present invention, it is possible to lock a stored article such as a battery as well as a lid, and to lock only the stored article, using a single locking member separately and with easy operation.

DETAILED DESCRIPTION OF THE INVENTION

Figure 1:
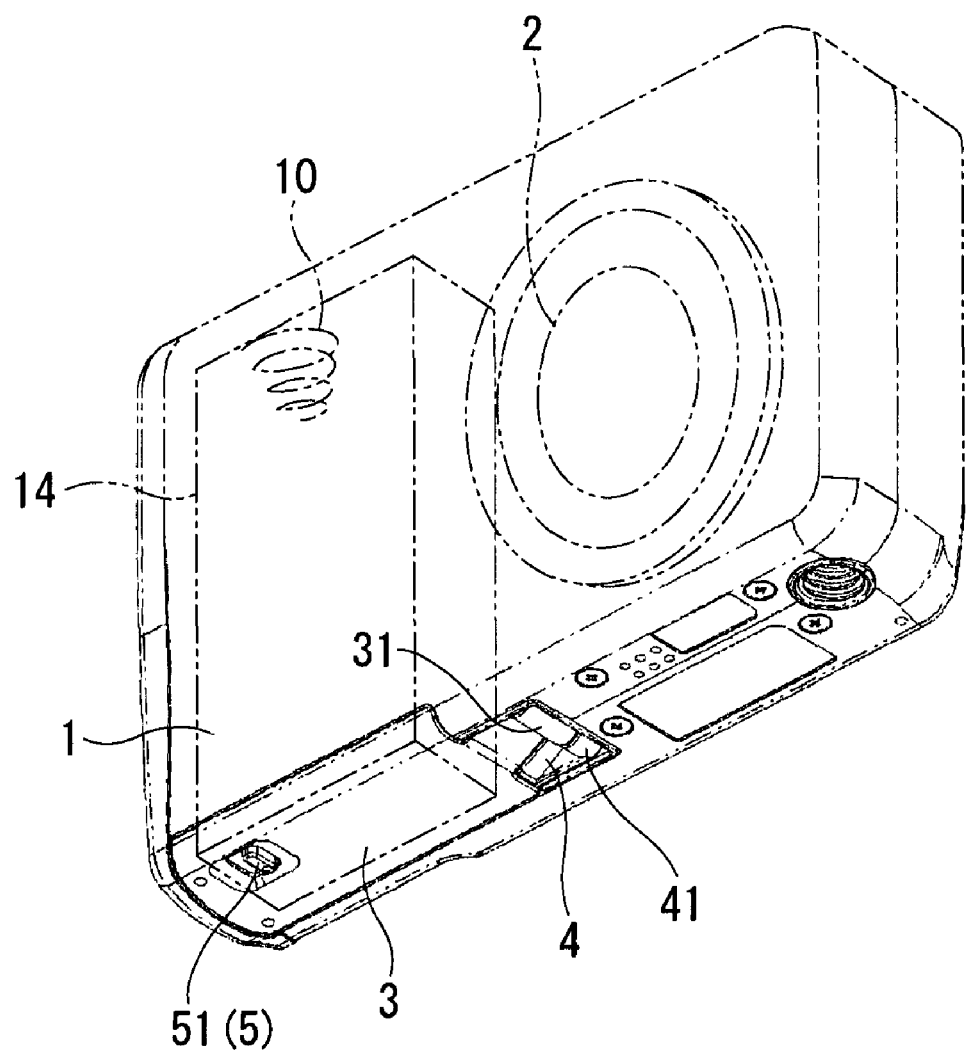
FIG. 1 is a perspective view of a digital camera according to the present invention.

In a preferred embodiment discussed in detail below with reference to drawings, the present invention is implemented in a digital camera. As shown in FIG. 1, the digital camera according to the present invention includes a casing 1 provided with a lens 2 on a front surface thereof, a housing 14 for a battery and a memory card inside the casing 1, and a lid 3 closing the housing 14. The lid 3 has an axis 31 about which the lid 3 is openable and closable.

Adjacent to the base end of the lid 3, a door 4 is provided for opening to bring a code extending from a so-called DC coupler out of the casing 1 when the DC coupler is accommodated in the housing 14 instead of a battery. The door 4 has an axis 41 coaxial with the axis 31 of the lid 3, and is openable and closable about the axis 41.

The lid 3 is provided with a small window 34, and an operation piece 51 of a locking member 5 to be described later projects from the small window 34. When the operation piece 51 is pressed in the direction of the arrow shown in FIG. 3 from the locking position shown in FIG. 2, the locking member 5 slides, and as a result, the locking member 5 moves to a first unlocking position to unlock the lid 3, thereby allowing the lid 3 to open as shown in FIG. 4. When the lid 3 opens, the upper end surfaces of a battery 6 and a memory card 61 are exposed from an opening 15.

In the state shown in FIG. 4, a tongue piece 53 of the locking member 5 projects to the upper end surface of the battery 6 to lock the battery to the housing position. When the operating piece 51 is pressed in the direction of the arrow shown in FIG. 5 from that state, the tongue piece 53 of the locking member 5 retreats from the upper end surface of the battery 6, and then the locking member 5 moves to the second unlocking position to unlock the battery 6. This allows the battery 6 to be removed from the housing.

The locking member 5 is slidably supported with respect to the casing 1, and provided with the operation piece 51 on the surface thereof as well as a right and left pair of projecting pieces 52, 52 on both sides thereof. A right and left pair of engagement reception pieces 32, 32 are formed on a rear surface of the lid 3. The engagement reception pieces 32, 32 correspond to the pair of projecting pieces 52, 52 of the locking member 5 so that the projecting pieces 52, 52 engage with the engagement reception pieces 32, 32.

Figure 6A:
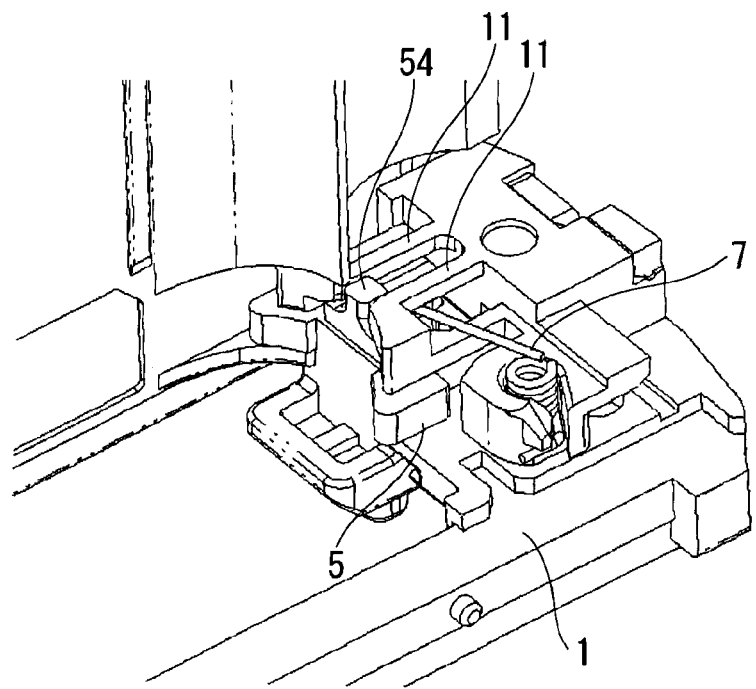
FIGS. 6a and 6b are a perspective view and a transverse cross-sectional view respectively of the locking member located at the locking position and peripheral mechanism thereof.

Also, the locking member 5 is provided with a boss 54 projecting toward the direction opposite to the operation piece 51 as shown in FIG. 6a. The boss 54 is held by a right and left pair of guiding parts 11, 11 formed on the casing 1, and thus the locking member 5 is guided to slide.

Figure 6B:
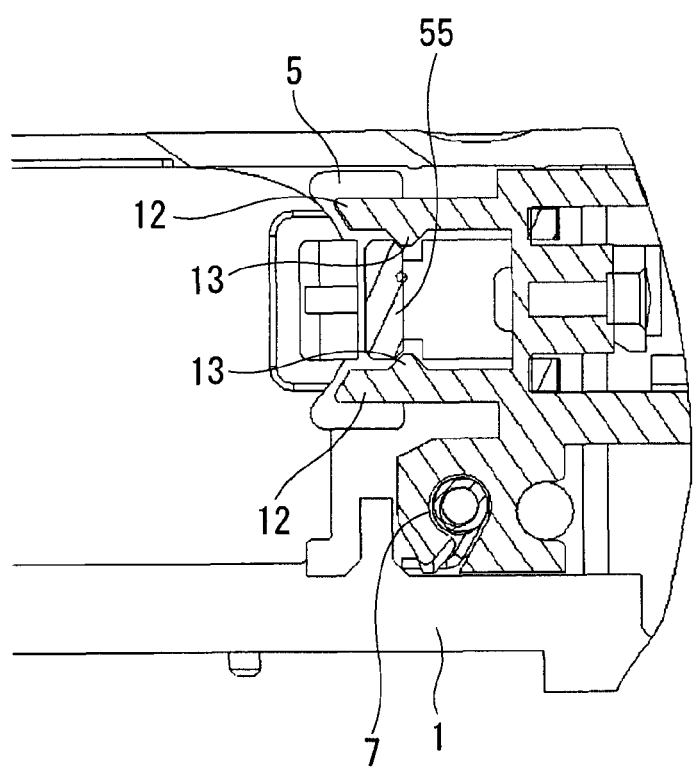

Further, the locking member 5 is provided with a flange part 55, shown in FIG. 6b, formed thereon between the operation piece 51 and the boss 54. The flange part 55 is held by a right and left pair of arm parts 12, 12 formed on the casing 1. Trapezoidal shaped projecting parts 13, 13 are formed on the arm parts 12, 12 to form a click feeling providing mechanism which provides a click feeling to the operation of the locking member 5 when the flange part 55 moves along the arm parts 12, 12.

The casing 1 is provided with a torsion spring 7 as shown in FIG. 6a, and the locking member 5 is urged by the torsion spring 7 toward the housing.

Figure 4:
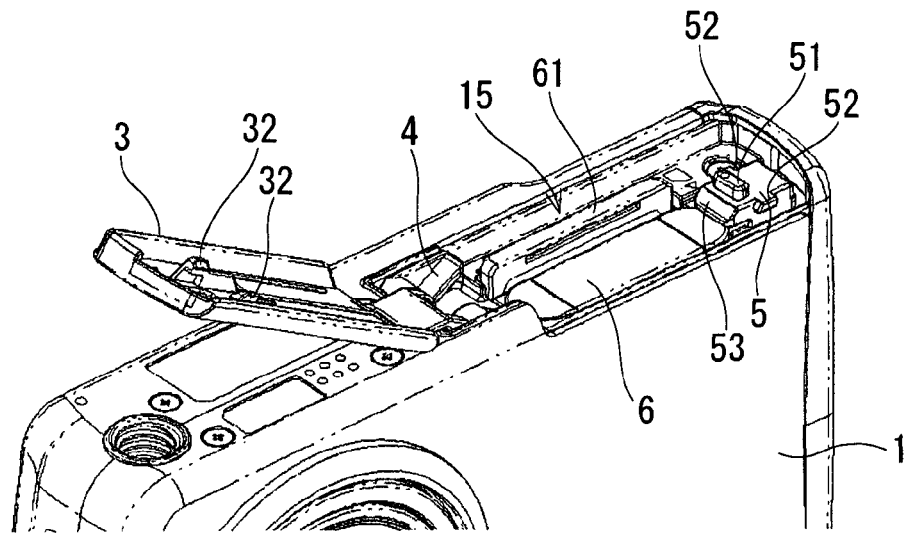
FIG. 4 is a perspective view of the digital camera with a lid open.
Figure 5:
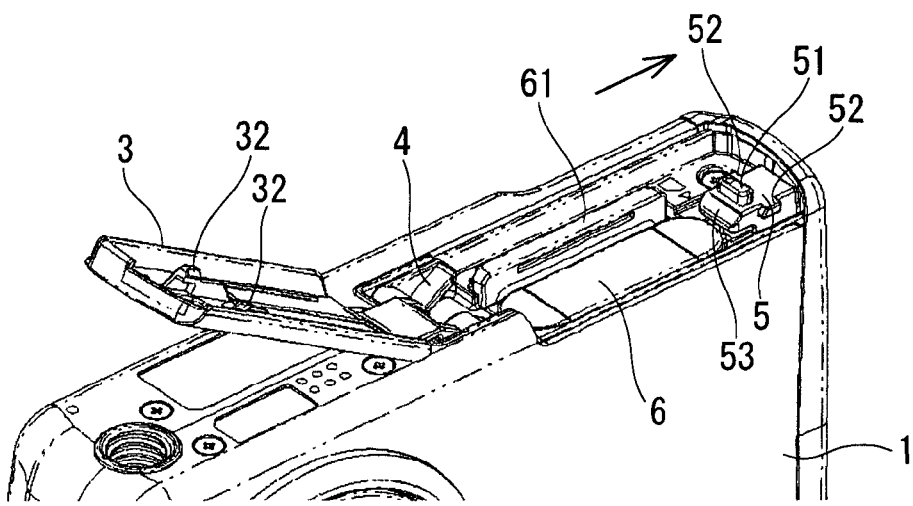
FIG. 5 is a perspective view of the digital camera with the locking member moved to a second unlocking position.

When the locking member 5 is moved from the first unlocking position shown in FIG. 4 to the second unlocking position shown in FIG. 5, the operation piece 51 is pressed against the urging force of the torsion spring 7. If the user releases the user's hand from the operation piece 51 at the second unlocking position, the locking member 5 returns to the first unlocking position shown in FIG. 4 due to the urging force of the torsion spring 7.

Figure 2:
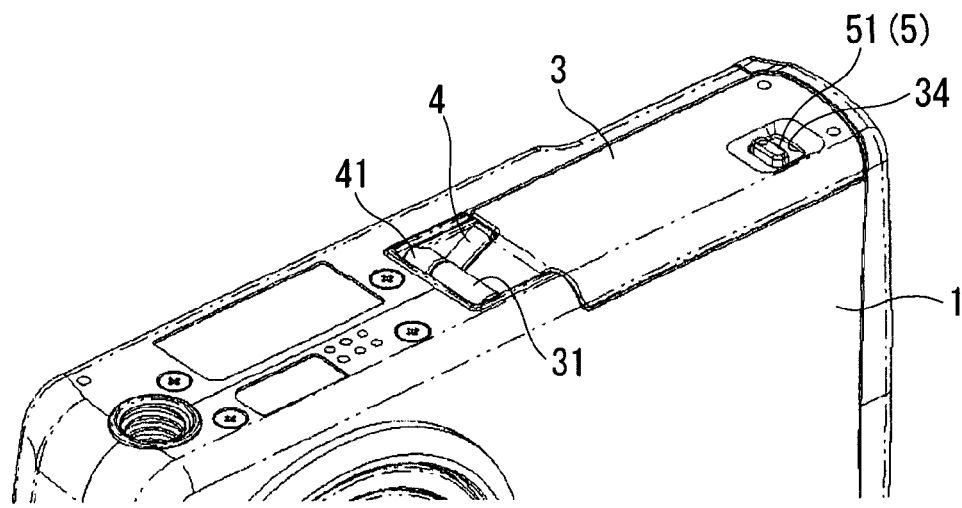
FIG. 2 is a perspective view of the digital camera with a locking member located at a locking position.
Figure 10A:
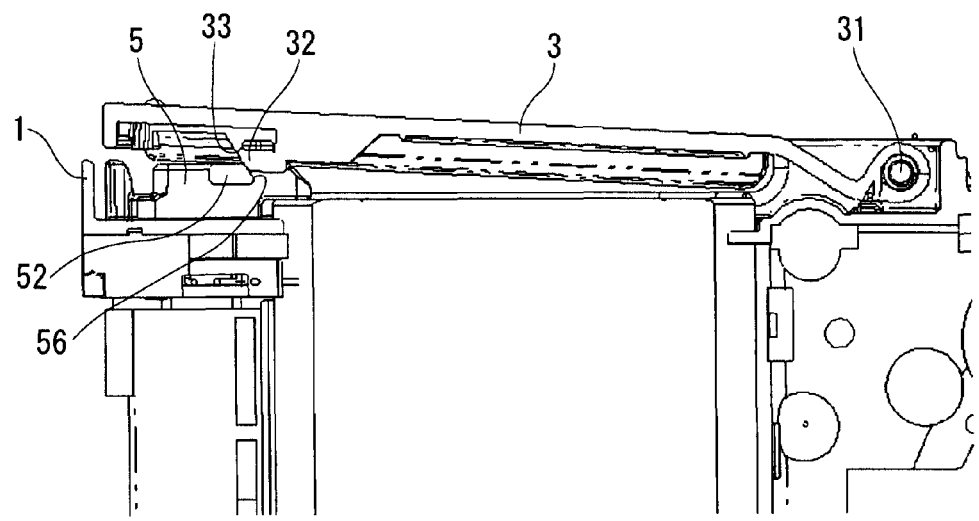
FIGS. 10a and 10b are longitudinal cross-sectional views showing closing action of the lid with the locking member located at the locking position in another configuration.
Figure 10B:
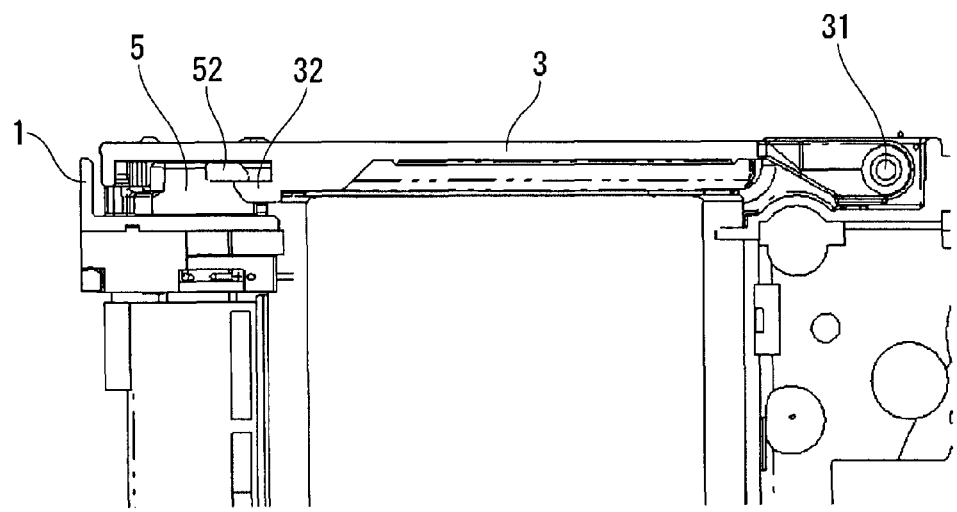

When the locking member 5 is located at the locking position shown in FIG. 2, the projecting pieces 52, 52 of the locking member 5 engage with the engagement reception pieces 32, 32 of the lid 3 as shown in FIG. 10b to lock the lid 3 to the closing position. Also, the tongue piece 53 of the locking member 5 shown in FIG. 4 projects to the upper end surface of the battery 6 to lock the battery 6 in the housing position. Here, as shown in FIG. 6b, the flange part 55 of the locking member 5 is located between the arm parts 12, 12, and closer to the housing than the projecting parts 13, 13 are.

Figure 7A:
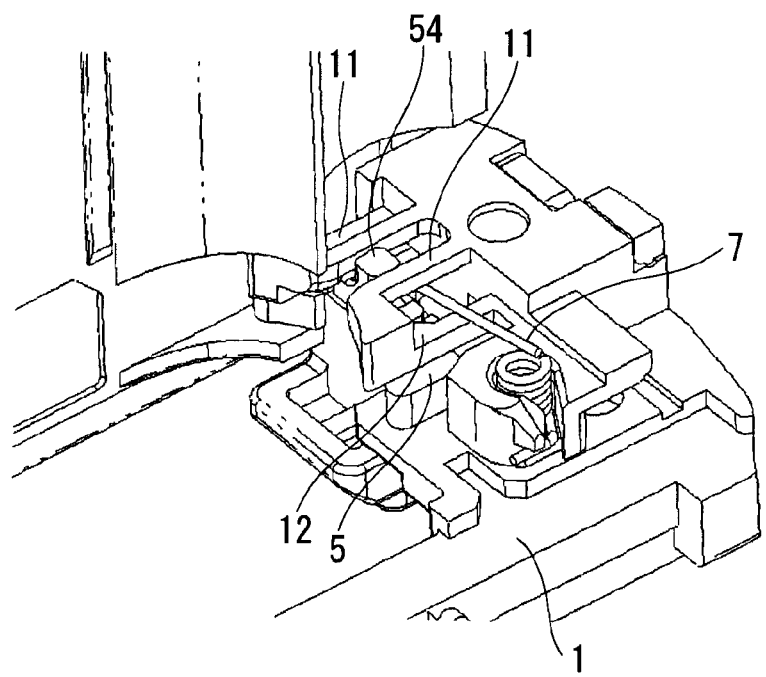
FIGS. 7a and 7b are a perspective view and a transverse cross-sectional view respectively of the locking member located at the first unlocking position and peripheral mechanism thereof.
Figure 7B:
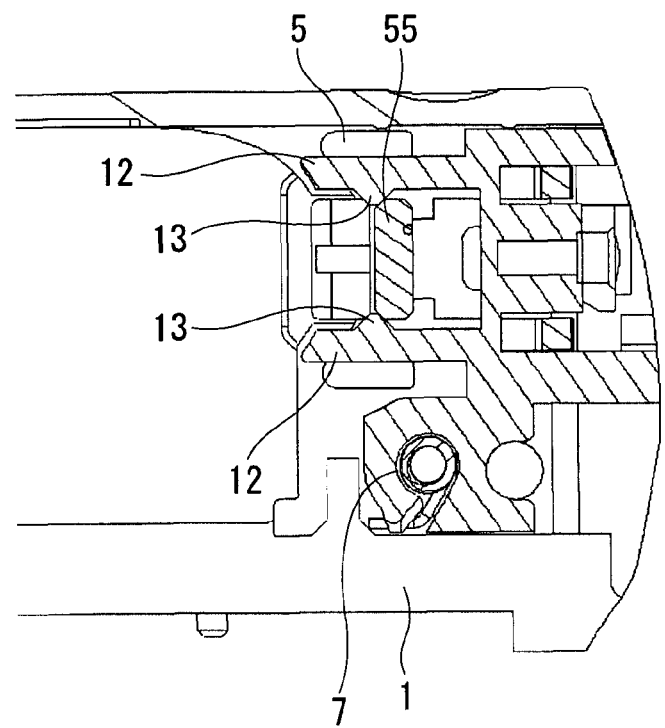

When the locking member 5 is moved from the locking position to the first unlocking position, the flange part 55 of the locking member 5 surmounts the projecting parts 13, 13 of the arm parts 12, 12 of the casing 1 to move to the side of the projecting parts 13, 13 opposite to the housing as shown in FIGS. 7a and 7b. Here, the pair of arm parts 12, 12 elastically deform and then elastically return to provide the click feeling to the operation of the locking member 5. And then the locking member 5 is held at the first unlocking position shown in FIG. 3 by the urging force of the torsion spring 7.

In a state where the locking member 5 is located at the first unlocking position, the projecting pieces 52, 52 of the locking member 5 are removed from the engagement with the engagement reception pieces 32, 32 to unlock the lid 3, thereby allowing the lid 3 to be opened. In this state, the tongue piece 53 of the locking member 5 projects to the opening 15 of the casing 1, and the upper end surface of the battery 6 is latched by the tongue piece 53. Thus the lock of the battery 6 is maintained.

Figure 8A:
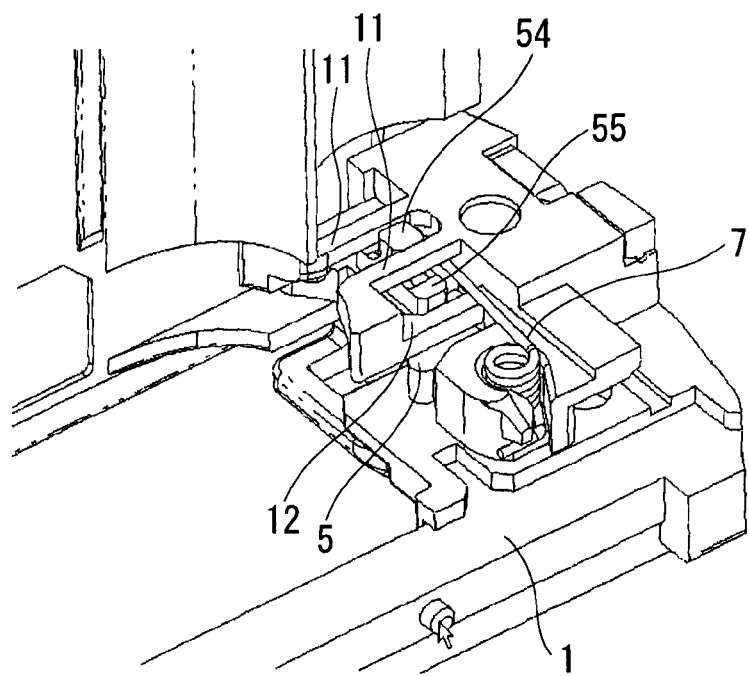
FIGS. 8a and 8b are a perspective view and a transverse cross-sectional view respectively of the locking member located at the second unlocking position and peripheral mechanism thereof.
Figure 8B:
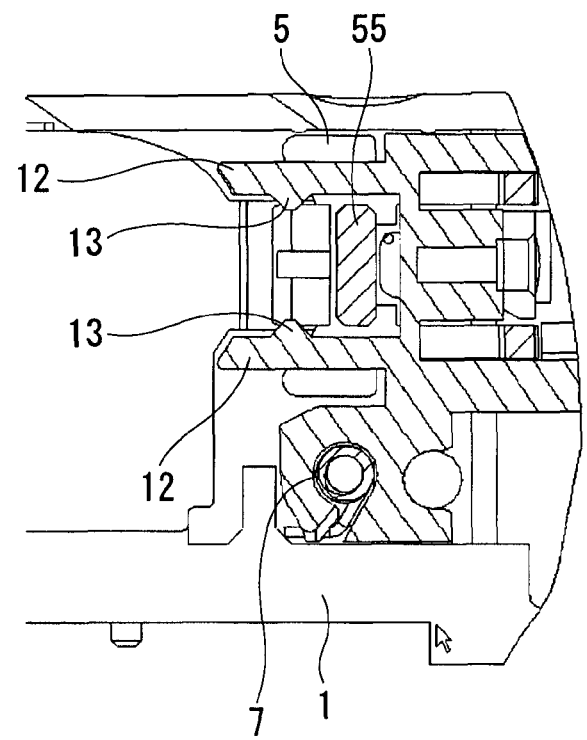

When the locking member 5 is moved from the first unlocking position to the second unlocking position against the urging force of the torsion spring 7, the flange part 55 of the locking member 5 moves along the pair of arm parts 12, 12 of the casing 1 as shown in FIGS. 8a and 8b.

When the locking member 5 reaches the second unlocking position, the tongue piece 53 of the locking member 5 is removed from the upper end surface of the battery 6 to unlock the battery 6 as shown in FIG. 5. When unlocked, the battery 6 is urged in the jumping direction by ejecting means provided on the bottom of the housing 14 such as a battery ejecting spring 10 as shown in FIG. 1 or an electrode piece which is not shown, and then the battery 6 slightly projects from the housing 14.

As a result, the battery 6 can be removed. Once the battery 6 is removed from the housing 14, the locking member 5 returns to the first unlocking position due to the urging force of the torsion spring 7.

In order to put the battery 6 in the housing as shown in FIG. 5, the tongue piece 53 of the locking member 5 located at the first unlocking position is pressed by the end of the battery 6 while the battery 6 is being inserted in the housing. The tongue piece 53 is sphenic, and therefore has a camming action, so that the locking member 5 is pressed by the battery 6 to retreat and allow the battery 6 to pass therethrough.

Once the battery 6 is completely accommodated in the housing, the locking member 5 returns to the first unlocking position due to the urging force of the torsion spring 7, and the tongue piece 53 of the locking member 5 latches the upper end surface of the battery 6 as shown in FIG. 4 to lock the battery 6 to the housing position.

Figure 3:
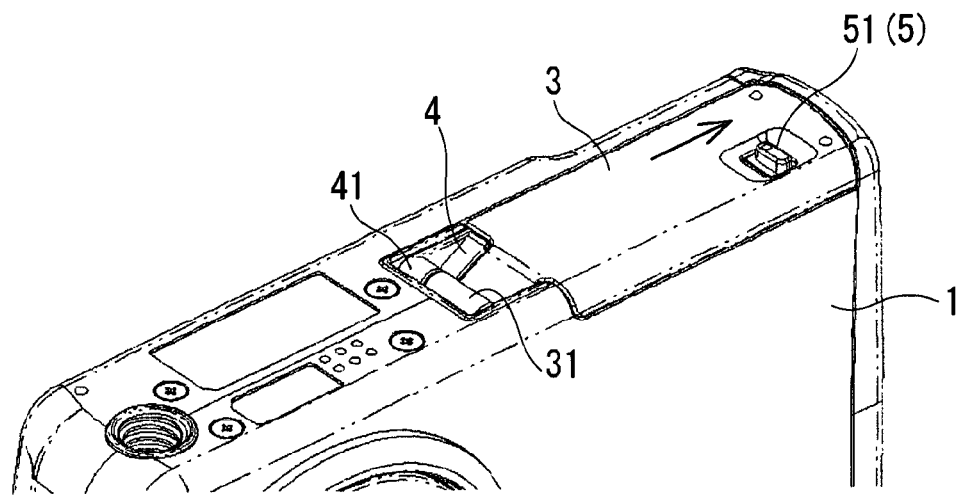
FIG. 3 is a perspective view of the digital camera with the locking member located at a first unlocking position.

Then, when the lid 3 is closed as shown in FIG. 3 and the locking member 5 is moved to the locking position shown in FIG. 2, the projecting pieces 52, 52 of the locking member 5 engage with the engagement reception pieces 32, 32 of the lid 3 as shown in FIG. 10b to lock the lid 3 in the closing position.

Figure 9A:
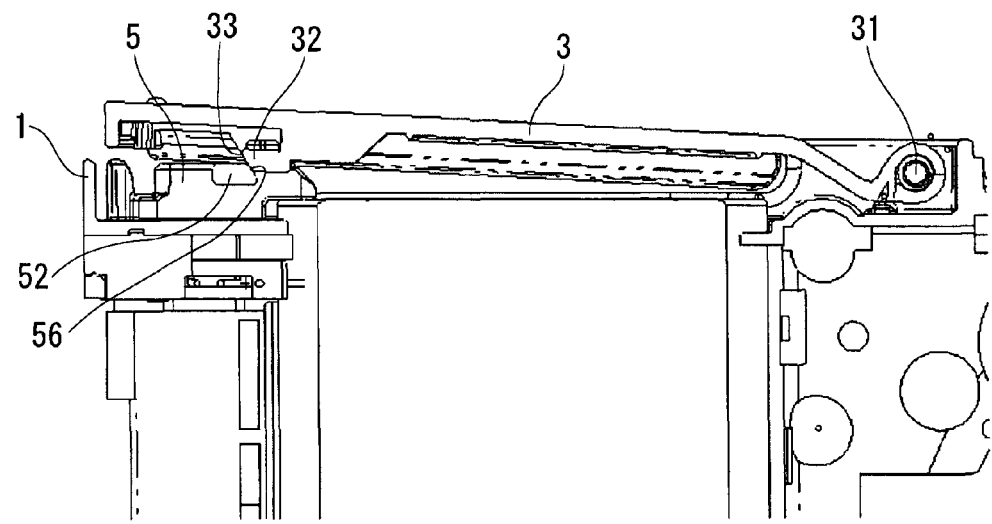
FIGS. 9a and 9b are longitudinal cross-sectional views showing closing action of the lid with the locking member located at the locking position.

In particular, as shown in FIG. 9a, the projecting pieces 52, 52 of the locking member 5 and the engagement reception pieces 32, 32 of the lid 3 include inclined surfaces 56, 33 capable of coming into slidable contact with each other formed on opposed parts thereof respectively. When the lid 3 is closed with the locking member 5 located at the locking position as shown in the figure, the inclined surface 33 formed on the engagement reception piece 32 of the lid 3 comes into slidable contact with the inclined surface 56 formed on the projecting piece 52 of the locking member 5. And then, when the lid 3 is further closed to the completely closed position, the inclined surface 33 formed on the engagement reception piece 32 presses the inclined surface 56 formed on the projecting piece 52, and the camming action moves the locking member 5 in a direction away from the housing.

Figure 9B:
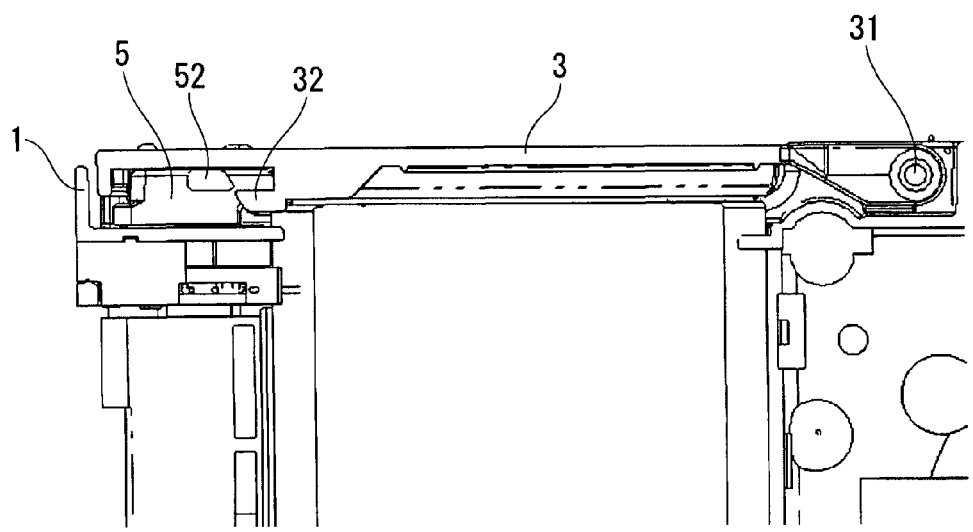

As a result, the locking member 5 reaches the first unlocking position as shown in FIG. 9b. When the locking member 5 moves from the locking position to the first unlocking position, the flange part 55 of the locking member 5 passes through the projecting parts 13, 13 as shown in FIG. 6b, and finally the locking member 5 is held in the first unlocking position shown in FIG. 2.

Therefore, even when the lid 3 is closed with the locking member 5 located at the locking position, damage due to the collision of the engagement reception piece 32 of the lid 3 with the projecting piece 52 of the locking member 5 can be avoided.

It is also possible to realize a different operation from the above mentioned operation by adjusting the magnitude relation of the driving distance of the locking member 5 due to the camming action of the inclined surfaces 33, 56 and the distance which the flange part 55 of the locking member 5 moves before it passes through the projecting parts 13, 13 of the arm parts 12, 12 formed on the casing 1 during the operation of closing the lid 3 with the locking member located at the locking position.

In particular, it is also possible to adopt the structure in which in the case where the lid 3 is closed with the locking member 5 located at the locking position, the flange part 55 of the locking member 5 shown in FIG. 6b does not completely pass through the projecting parts 13, 13 but climbs the inclined surface of the projecting parts 13, 13 halfway. In this structure, when the lid 3 is completely closed, the locking member 5 is urged toward the housing due to the elastic return of the arm parts 12, 12, and finally returns to the locking position to lock the lid 3, thereby realizing an automatically locking system.

According to the digital camera of the present invention described above, it is possible to realize the state of locking both the battery 6 and the lid 3 and also the state of locking only the battery 6 by using a single locking member 5. The unlocking operation can be performed by an easy operation to only slide the locking member 5.

In addition, since the locking mechanism for the battery 6 and the lid 3 is realized by using a single locking member 5, it is possible to realize the miniaturization of the locking mechanism, which can lead to the miniaturization of the digital camera.

The present invention is not limited to the foregoing embodiment in construction but can be modified variously by one skilled in the art without departing from the spirit of the invention as set forth in the appended claims. For example, the present invention can be implemented not only in the digital camera, but also different kinds of electronic devices comprising a housing and a lid. Also, the housing is not limited to the housing for a battery and a memory card, but can be the housing for different kinds of articles such as an attached component or an extended circuit unit.

What is claimed is:

1. An electronic device including a casing provided with an article housing formed therein and opening to the outside of the casing, the article housing being capable of opening and closing by means of a lid pivotally supported on the casing and capable of being locked to a closing position by a locking mechanism, wherein the locking mechanism comprises a locking member movably supported with respect to the casing, and an engagement reception piece formed on the lid and engaging with the locking member, the locking member being movable among a locking position where a part of the locking member projects to an opening of the article housing so that the locking member engages with the engagement reception piece to lock the lid to the closing position, a first unlocking position where the locking member retreats from the locking position and is removed from the engagement reception piece while the part of the locking member still projects to the opening of the article housing, and a second unlocking position where the locking member retreats from the first unlocking position and the part of the locking member does not project to the opening of the article housing with a moving operation.

2. The electronic device according to claim 1, wherein the locking mechanism comprises a click feeling providing mechanism providing a click feeling to the operation of the locking member when the locking member moves between the locking position and the first unlocking position.

3. The electronic device according to claim 1, wherein the locking mechanism comprises an urging member urging the locking member from the second unlocking position toward the first unlocking position.

4. The electronic device according to claim 1, wherein the lid and the locking member include a cam face and a cam receiving face on the parts opposed to each other respectively, the cam face and the cam receiving face coming into slidable contact with each other to press the locking member from the locking position toward the first unlocking position when the lid is closed with the locking member located at the locking position.

* * * * *